United States Patent [19]
Takayanagi

[11] Patent Number: 6,105,309
[45] Date of Patent: Aug. 22, 2000

[54] PLANT CULTIVATION METHOD AND APPARATUS

[75] Inventor: Eifu Takayanagi, Fujisawa, Japan

[73] Assignee: E.T. Harvest Co., Ltd., Tokyo, Japan

[21] Appl. No.: 09/242,172

[22] PCT Filed: Jun. 5, 1998

[86] PCT No.: PCT/JP98/02510

§ 371 Date: Feb. 10, 1999

§ 102(e) Date: Feb. 10, 1999

[87] PCT Pub. No.: WO98/56236

PCT Pub. Date: Dec. 17, 1998

[30] Foreign Application Priority Data

| Jun. 13, 1997 | [JP] | Japan | 9-171180 |
| Nov. 13, 1997 | [JP] | Japan | 9-312091 |
| Nov. 13, 1997 | [JP] | Japan | 9-312092 |
| Nov. 21, 1997 | [JP] | Japan | 9-336597 |

[51] Int. Cl.$^7$ ............................................. A01G 31/00
[52] U.S. Cl. ......................... 47/62 R; 47/62 A; 47/62 N
[58] Field of Search ................... 47/62 R, 62 A, 47/62 E, 62 C, 62 N, 63, 64, 65, 48.5

[56] References Cited

U.S. PATENT DOCUMENTS

| 4,334,386 | 6/1982 | Burcombe et al. | 47/62 E |
| 4,543,744 | 10/1985 | Royster | 47/60 |
| 4,669,217 | 6/1987 | Fraze | 47/62 E |
| 4,780,989 | 11/1988 | Mears et al. | 47/64 |
| 5,001,859 | 3/1991 | Sprung | 47/48.5 |
| 5,876,484 | 3/1999 | Raskin et al. | 47/62 N |
| 5,887,383 | 3/1999 | Soeda | 47/62 R |

*Primary Examiner*—Charles T. Jordan
*Assistant Examiner*—Elizabeth Shaw
*Attorney, Agent, or Firm*—Armstrong, Westerman, Hattori, McLeland & Naughton

[57] ABSTRACT

The plant cultivation apparatus and plant cultivation method hasten the growth of a plant root without root injury even if the basic root has been sufficiently bathed in cultivation water solution, reduce a cost for competing with alleyway vegetables by reducing electric power consumption as much as possible, which has been the greatest factor for cultivation cost, by utilizing fluorescent light as efficiently as possible for cultivating the plant while oxygen necessary for growing the plant root can be supplied sufficiently and bacteria cannot be produced, and prevent heat injury such as a chip-burn by minimizing heat energy generated by the light source (fluorescent light). In the method for growing plants using the artificial light by bathing the plant root in cultivation water solution containing fertilizer and forcibly blowing air containing high density carbon dioxide gas into cultivation water solution intermittently during a plant cultivation term, the plant root including the base has been completely bathed in cultivation water solution. The fluorescent light is used as the artificial light. All the inside walls of the cultivation room are covered with light reflection layers. Additionally, the output of the fluorescent light is controlled to 30 to 70% of rated specification. As a result, the plant can be cultivated with a minimum quantity of light.

11 Claims, 12 Drawing Sheets

PLANT CULTIVATION METHOD AND APPARATUS

BACKGROUND OF THE INVENTION

1. Field of the Invention

This invention relates to a method for growing plants and an apparatus for growing plants for hydroponic vegetables, flowers, grasses, and so forth using an artificial light source.

Furthermore, this invention relates to an improved cultivation apparatus and an improved cultivation method for growing plants very efficiently, in which a cultivation room is covered with a reflection layer, a fluorescent light is used as the artificial light source, and a pump forcibly blows air containing high density carbon dioxide gas into cultivation water solution in a cultivation container.

2. Description of Related Art

The several kinds of hydroponic cultivation apparatuses and methods for growing plants without using sunbeams and natural soil have been well-known.

The apparatuses, for example, have been found in an official gazette for Toku-Kai-Hei 7-50941, Toku-Kai-Hei 7-50929, Toku-Kou-Hei 6-61190, Toku-Kai-Sho 63-240731 developed by the present inventor, and Toku-Kai-Sho 62-55028~55029.

The above-described conventional embodiments are the apparatuses in which a fluorescent light is used as a light source of the hydroponic cultivation, the position of the fluorescent light is moved along with the growth of the plants, the distance between the upper portion of the plant and the position of the fluorescent light has been kept constant within the predetermined length.

However, in the hydroponic cultivation, especially for green vegetables, it has been a problem to cause a heat trouble. The heat trouble is a phenomenon in which a leaf is crinkled up and/or becomes black (chip-burn). It is very important that strong attention should be paid in order not to cause the chip-burn in the hydroponic cultivation because the commercial worth of the cultivation green vegetables becomes nothing if the part of the leaf, to say nothing of the whole leaf, has caused the chip-burn.

The hydroponic cultivation using an artificial light source, such as a high pressure sodium light or a metal halide light, producing a lot of heat energy usually causes the heat problem. Accordingly, the distance between the leaf and the light should be adjusted in order to avoid this kind of problem.

It has been considered that the chip-burn has been a phenomenon in which the surface of the leaf has been damaged because the heat energy of the artificial light source has been stored in the leaf surface and the radiation of the stored heat energy has not been done fully. The natural sunbeams would not cause the chip-burn, but the artificial light cultivation would cause the chip-burn.

Therefore, the chip-burn will be avoided if the heat radiation from the leaf surface will be made fully and the heat generation (especially radiant heat) will be made less by performing the high efficiency to contribute the plant growth by the artificial light.

According to the conventional apparatuses, a time (namely, night) has been given to stop irradiation by setting intermittently the irradiation time and/or blowing the cold air on the central portion of the plant. However, there have been defective points such as the complexity of facilities with the increase of the electric power consumption for blowing the cold air and a delay for growing the plants because of not making photosynthesis during the time when the irradiation has been stopped for setting the irradiation time.

There is an idea in which the plants receive the only visible rays through an optical fiber by eliminating heat rays contained in light emitted from the conventional light source (Toku-Kai-Hei 7-107868). However, this idea has not been realistic because a quantity of light has not been sufficient, a large number of optical fibers have been necessary to get a sufficient quantity of light, and the apparatus would be expensive and complex as a result.

Further, it has been considered that a sufficient quantity of oxygen has been necessary for growing a root. Thus, according to the conventional apparatuses, a several centimeters oxygen layer A has been commonly installed between the surface of the cultivation water solution and a cultivation base supporting the plant as seen in FIGS. 4 and 5.

However, these types of apparatuses have not been preferable for growing the plant root because there has been the special portion of the plant root which has been exposed in the air and the plant root rarely grow in the air. It is very important for the plant to grow healthy because the plant should grow healthy and plant leaves' growth is closely related to the plant root condition.

Nevertheless, until now, it has been thought that the plant root has been very easy to decay because of an oxygen supply shortage for the plant root when the whole plant root including the base root has been completely soaked.

Namely, a lot of plant cultivation apparatuses, which have been used for the hydroponic cultivation using the artificial light, have been proposed. FIG. 5 illustrates one example of the above described plant cultivation apparatuses, (a) is a sectioned drawing of a plant cultivation container, and (b) illustrates one example of the plant cultivation base.

In the upper portion of a cultivation container 1, a cultivation base 44, which provides a plurality of holes 43 for accepting the plants, is provided. In the cultivation container 1, cultivation water solution 49 is filled until the water level 45 apart from the plant cultivation base 44. In the case of the same area of the cultivation container 1, the higher water level is preferable as much as possible because the plant roots grow well and cultivation water solution temperature and composition will not change if a quantity of cultivation water solution is large as much as possible. However, it has been necessary to provide space between the water level and the plant cultivation base 44 because cultivation water solution 49 will overflow when a quantity of water is changed and working is made in such a way that the plants are set to the cultivation container 1 or removed from the cultivation container 1 if the water level 45 is extremely high.

However, as described before, if there is space between the plant cultivation base 44 and the water level 45 of the cultivation water solution 49, there is a problem that the roots will not grow well from the root position in the space described above and water wetting the reverse side of the plant cultivation base 44 drops outside the cultivation container from the surface of the plant cultivation base 44, dirties the plant cultivation apparatus, and wets the light source apparatus for irradiating the plants and so forth. Further, water dropping outside the cultivation container may result in the decrease of cultivation water solution quantity of the cultivation container, then water should be added to cultivation water solution to fill up. Further, in the case of multi-layered cultivation structure, when water in the upper cultivation container drops outside the cultivation container, an electric leak will be caused in an electric system of the lower cultivation container.

SUMMARY OF THE INVENTION

An object of the present invention is to provide a hydroponic cultivation apparatus and a hydroponic cultivation method for hastening the growth of a plant root without causing root decay even if the whole plant root including the base root is completely bathed in cultivation water solution, providing oxygen enough to grow root, and suppressing the growth of bacteria. Moreover, the object of the present invention is to provide a plant cultivation apparatus and a plant cultivation method for allowing a lot of plants to grow in a small area and capacity by releasing heat as much as possible from the plant cultivation apparatus in order to prevent the plants from a thermal accident and growing well a vegetable such as a head lettuce, a lettuce, a head lettuce crisp, or a tima santyu.

Further, the object of the present invention is to provide a plant cultivation apparatus for growing well a plant root, preventing condensed water dropping outside the apparatus as falling water and it dirties the apparatus, allowing a quantity of supply water to be smaller as much as possible, and preventing an electric leak from an electric system.

Further, the object of the present invention is to prevent the growth of injurious bacteria by completely bathing the whole root including the base root in the cultivation water solution.

Further, the object of the present invention is to provide the plant cultivation apparatus and the plant cultivation method for reducing an electric power cost, which is the main factor of the costs for growing the plants, by minimizing the electric power consumption by utilizing a fluorescent light efficiently and maximum for the plant cultivation, making the cultivation cost to be a competitive cost against the price found in an alleyway, and preventing heat injury such as a chip-burn by minimizing a quantity of heat generated from a light source such (fluorescent light).

To solve the above described objects, the present invention employs a method for completely bathing the whole plant root including the base root in cultivation water solution in the plant cultivation method using an artificial light source for growing the plants while air containing high density carbon dioxide gas is blowing into the above described cultivation water solution using a pump continuously during a term for the plant cultivation after the plant root has been bathed in the cultivation water solution containing a fertilizer ingredient. Further, bubbles are produced from the position nearly right under the cultivated plants.

The density of carbon dioxide gas is more than 500 ppm, preferably 1,000 to 5,000 ppm, and the plant is cultivated using the minimum quantity of light by covering all the insides of the plant growth room with a light reflection layer using the fluorescent light as the artificial light.

Further, to realize the above described objects, in the plant cultivation method using the artificial light source for cultivating the plants by the fluorescent light by covering all the walls of the cultivation room in which the carbon dioxide gas density has maintained 500 to 5,000 ppm and planting the plant roots in the cultivation water solution containing the fertilizer ingredient, the plants are cultivated by keeping the surface temperature of the fluorescent light as the same temperature as the room by controlling the output power of the fluorescent light to be 30 to 70% of the rated specification usage. The output of the fluorescent light is controlled by an inverter. The plants can be cultivated by contacting with the fluorescent light.

Further, the present invention is the plant cultivation apparatus having a nursery plant setting portion providing a plurality of nursery plant setting holes nearly close to the water level in the upper opening portion of the cultivation container filled with the cultivation water solution in which the nursery plant setting portion is connected to a slant member. The cultivation base is formed with the slant members connecting to flat portions supported by wall portions of the cultivation container. Using this kind of cultivation base, the whole plant root including the base root can be completely bathed in cultivation water solution.

The present invention is the plant cultivation apparatus in which a slant member, growing from a nurse plant installation member near each liquid surface of a plurality of cultivation containers installed in parallel, is jointed with a flat member.

Further, the present invention is the plant cultivation apparatus in which one or more shelves of cultivation rooms including at least one cultivation container is layered, a cultivation base is installed for installing a nursery plant over the cultivation container, light reflection members on the cultivation base and the ceiling face of the upper side and side walls of the cultivation room are provided, and air pathways for connecting to the outside or adjacent rooms are provided in the ceiling portion over the cultivation room and end portions of the light reflection members of the side walls of the cultivation room.

BRIEF DESCRIPTION OF THE DRAWINGS

The above object and features of the present invention will be more apparent from the following description of the preferred embodiments with reference to the accompanying drawings wherein.

DETAILED DESCRIPTION OF THE INVENTION

The preferred embodiment of the present invention is explained hereinafter using figures.

Hydroponic cultivation, especially for vegetables, has a problem for causing heat injury (chip-burn). The chip-burn is a phenomenon in which a leaf has been shrunk and withered because of too strong artificial light radiation. Commercial value will be nothing if the partial chip-burn occurs although the whole leaf is not withered, thus it is very important in the hydroponic cultivation for us to pay enough attention not to cause the chip-burn for the whole leaf including a pointed end.

It is thought that the chip-burn is a phenomenon in which the heat energy of the artificial light source has been stored on a leaf surface and the leaf surface has been damaged by the stored heat energy not irradiated enough. Thus, the chip-burn is the special phenomenon only for the hydroponic cultivation because it is not caused by natural sunbeams (sunlight). Therefore, the chip-burn cannot be caused if the heat radiation from the leaf surface is made enough and the heat energy (especially radiant heat) from the artificial light source is less generated as much as possible by raising efficiency as much as possible for growing the plants using the artificial light source not to store the above mentioned heat energy.

Thus, as described before (for example, Toku-Kai-Hei 7-50941), the inventor designed the apparatus for raising photosynthesis efficiency using the artificial light by covering surfaces as much as possible, which are all insides of the growing room for cultivation, with a reflection layer such as aluminum thin film. Here, a three wave length fluorescent light is used as the above artificial light source because irradiation caloric value is less and a spectrum distribution is best fit to plant growth.

To raise a contribution rate to the photosynthesis by the artificial light using multi-reflection relatively decreases a quantity of light (the number of light sources) of the artificial light as a result, thus the electric power consumption becomes less and the heat energy generated by the artificial light becomes less as much as possible in effect. At the same time, to decrease a quantity of light has effect for not causing a heat injury even if the light source is closed to the plants because radiant heat less influences. To install the light source right above the plants can decrease a space area for the cultivation container.

Here, it has been thought that evaporation from the leaf would increase if the plant root has grown well because water with nourishment has been absorbed well from the plant root. The more evaporation from the leaf is, the less the heat injury occurs because leaf surface temperature becomes low by evaporation.

Figure 4:
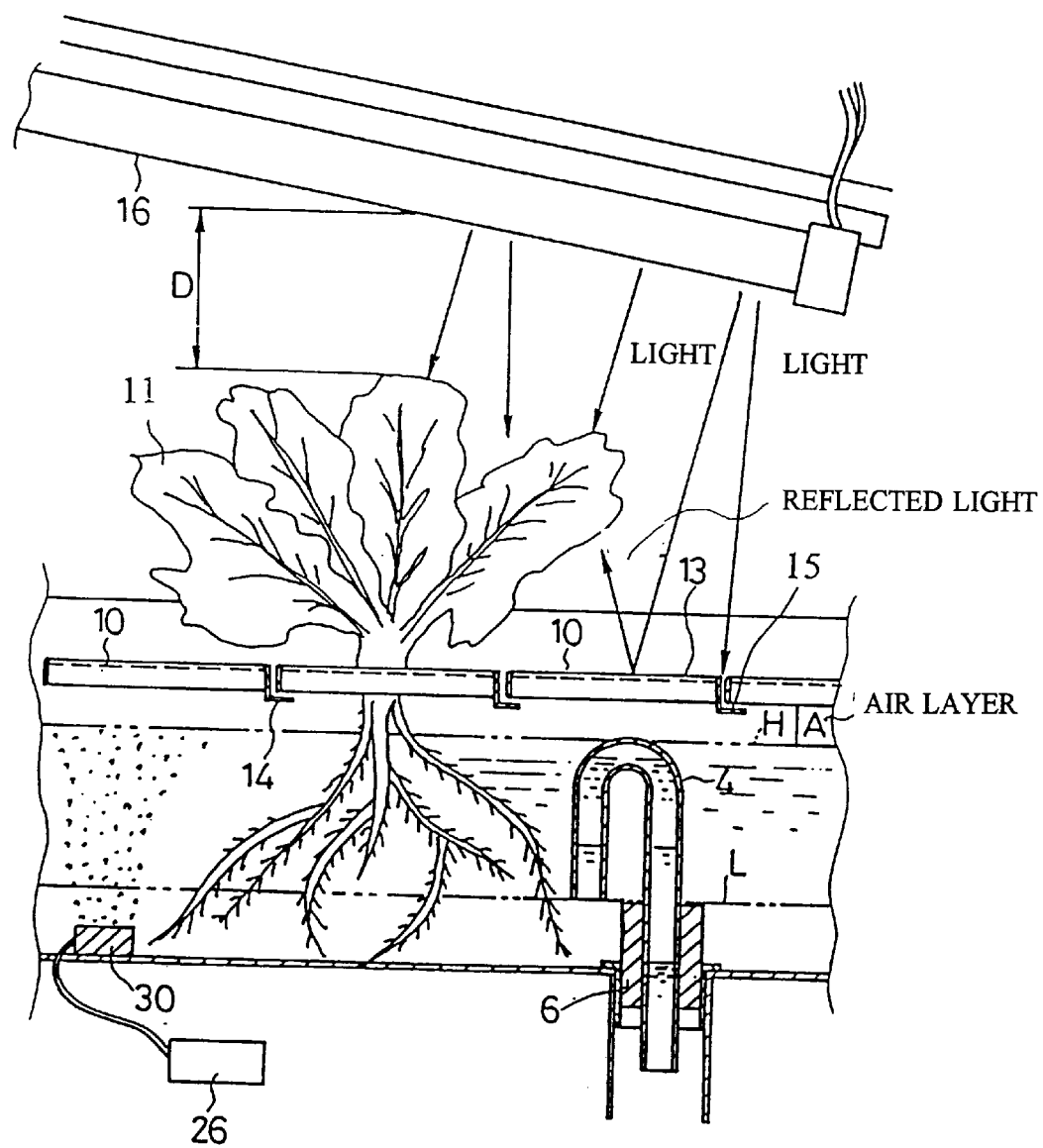
FIG. 4 is a detail partial cross section view of the conventional cultivation container apparatus of FIG. 2.

Up to now, it has been thought that oxygen supply has been necessary in order for the plant root to grow, thus the upper root portion of the plant has been exposed in an air layer A as shown in FIG. 4 for the hydroponic cultivation as a general idea for the apparatus. However, it is obvious that the most part of the root should be bathed in water completely. In this case, there are problems for oxygen supply to the root and root decay prevention.

The inventor has developed technology to prevent cultivation water solution decay by forcibly blowing high density carbon dioxide gas by a pump (Toku-Kou-Hei 6-61190, official gazette). By using this method, oxygen containing carbon dioxide gas can be supplied to cultivation water solution all the time, thus oxygen can be supplied enough to the root even if the whole root including the base root is completely bathed in the cultivation water solution. Namely, the above described high density carbon dioxide gas, although the density of carbon dioxide gas is high, contains enough oxygen necessary for growing the root, thus oxygen can be supplied enough to the root.

Based on the above described points, in the hydroponic cultivation method for forcibly and continuously blowing air containing high density carbon dioxide gas into cultivation water solution all the time using the pump, this invention can hasten the growth of the plant root by completely bathing the whole plant root including the base root in cultivation water solution. The root grows enough and then the leaves grow enough. The healthy leaves evaporate water from the surfaces of the leaves, thus heat energy radiation from the leaves' surfaces is hastened by evaporation heat. Thus, the chip-burn phenomenon can be prevented, and better circulation, in which the plants can be grown better, functions.

Further, oxygen is supplied well, and the root can be activated because air bubbles directly under the root permeate the whole root including the base root all the time. Further, the birth of bacteria in water can be suppressed by oxidized cultivation water based on high density carbon dioxide gas and a mixing effect by the air bubbles, so the hydroponic cultivation method according to the present invention never cause root decay although the whole root including the base root has been completely bathed in water all the time to supply enough oxygen. Moreover, as described before, the root growth can be hastened as not seen in the conventional technology by completely bathing the whole root including the base root in water, thus the growth of the plants can be hastened. Further, the chip-burn can be prevented because water is absorbed well from the root, evaporation from the leaves functions well, and the heat energy can be radiated well. Thus, a heat radiation problem, as we have had a hard time, from the leaf surface is solved, thus the fluorescent light can be set close to the plants in order to raise the utilization efficiency of light. Further, the present invention has a great success for decreasing an electric power consumption fee dynamically by using multi-reflection cultivation container.

The temperature inside a cultivation room is higher than the outside because the cultivation room is an airtight container by covering all the insides by the reflection plates and the artificial light source is installed inside the cultivation room, although the temperature surrounding the cultivation room, which is usually installed inside the building or a factory constructed with concrete, is controlled by an air conditioner because the temperature for growing the plants is preferably 15 to 19° C. As describing later in the specification for further details, in the present invention, the number of slight gaps are provided for the upper and lower sides of the cultivation room and the both sides of a ceiling reflection board and the floor of a cultivation container in order not to raise the temperature inside the cultivation room. The heated air inside the cultivation room is naturally released through the gaps to the outside of the cultivation room, accordingly the temperature inside the cultivation room does not go up.

Moreover, in the apparatus of the present invention, air containing carbon dioxide gas is produced and the air streams are produced from the bottom toward the other side of the leaf, thus the surface of the leaf can be cooled by the air streams in effect. In fact, the surface temperature of the leaf is 1 to 2° C. lower than the temperature of the cultivation room.

The present invention is explained hereinafter in detail based on the figures explaining the preferred embodiment.

Figure 2:
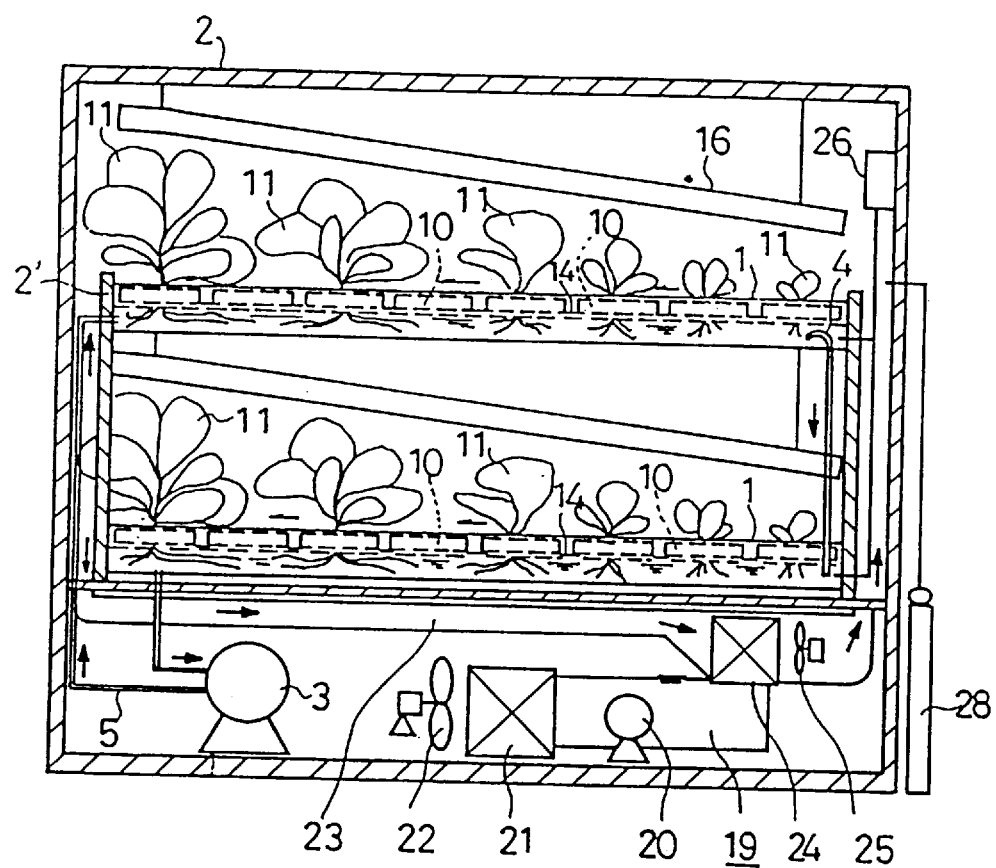
FIG. 2 is a general view for showing the preferred embodiment of a conventional plant cultivation container apparatus as a basic structure for the present invention.
Figure 3:
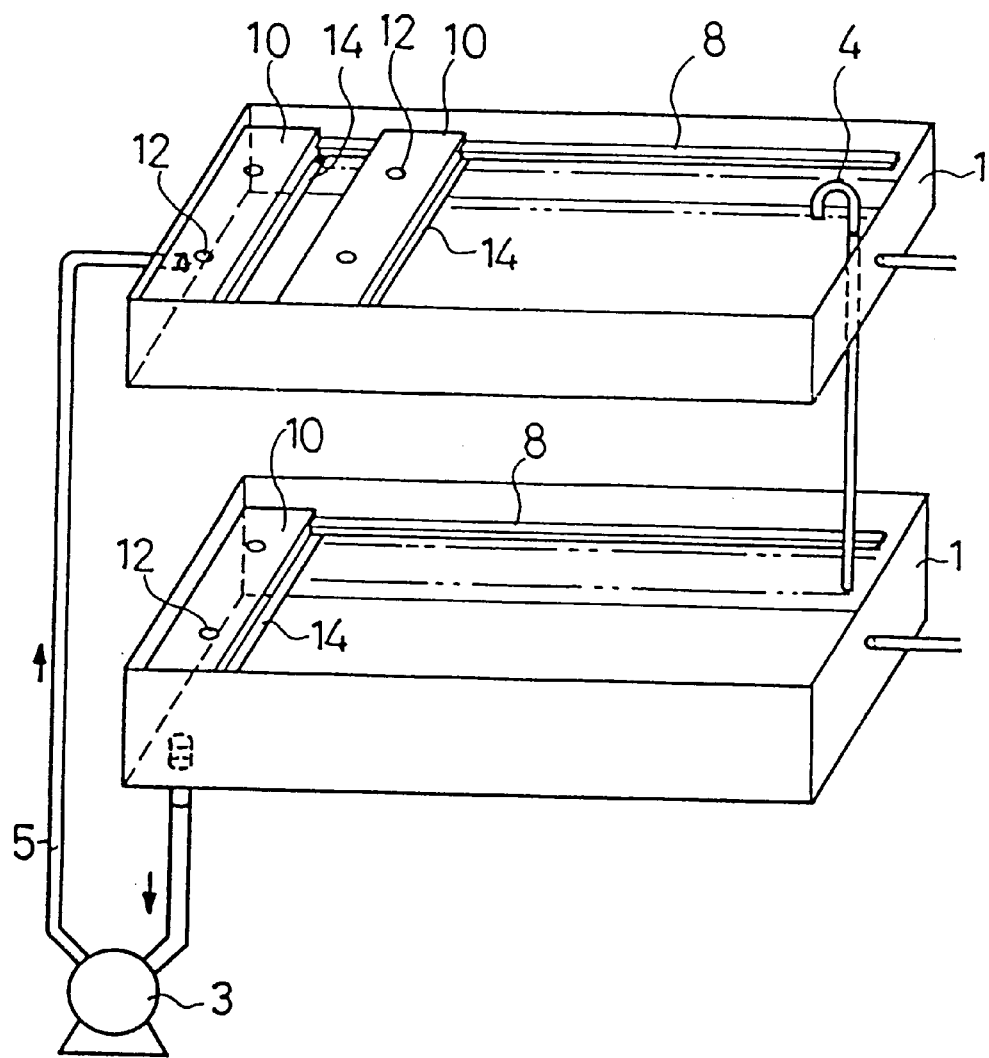
FIG. 3 is a general view for showing a part of structure of the conventional cultivation container apparatus of FIG. 2.
Figure 5:
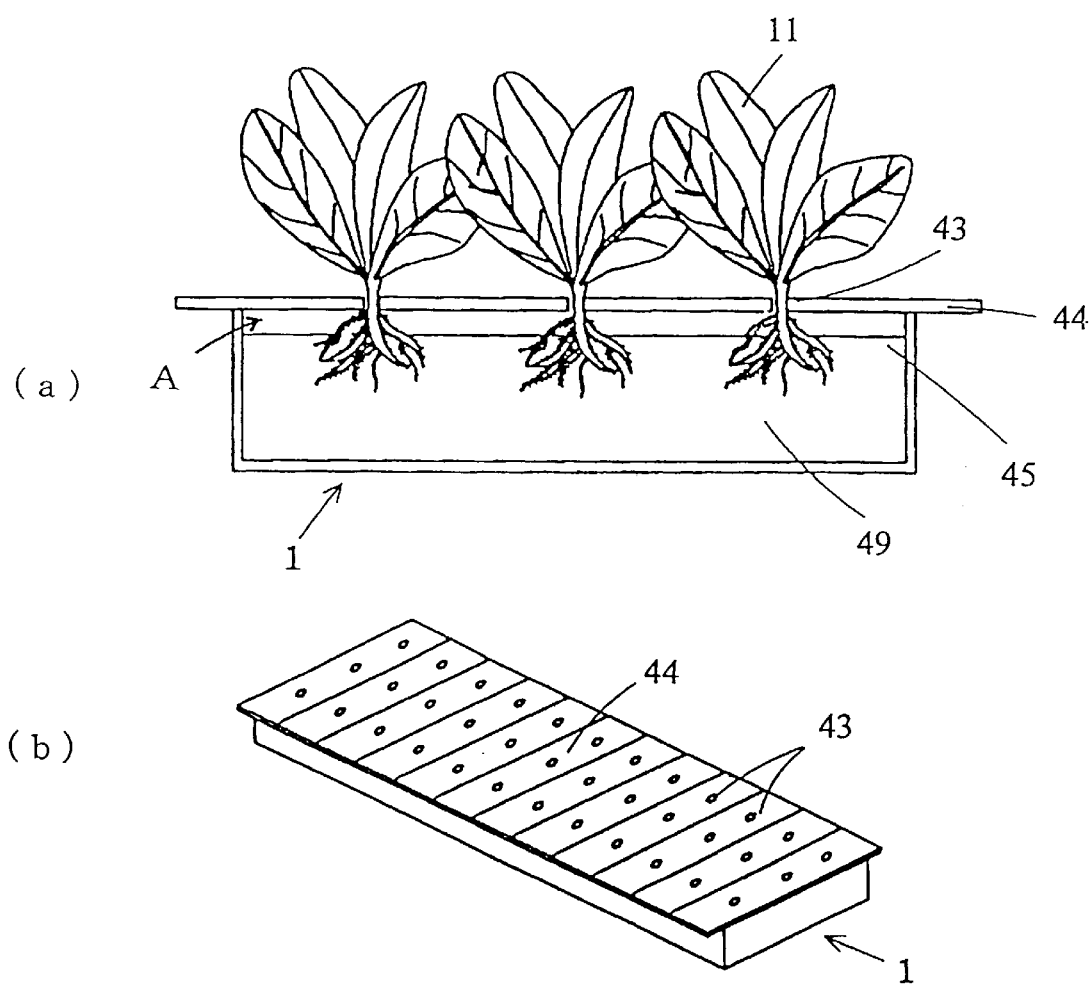
FIG. 5 is a cross section of the cultivation base of the conventional cultivation container apparatus.

FIG. 2 is a general diagram for showing the preferred embodiment of a conventional plant cultivation apparatus as a basic structure for the present invention. FIG. 3 is a general view of the cultivation container containing a circulating path for cultivation water solution. FIG. 4 is a detail partial cross section view. FIG. 5 is a cross section of the conventional cultivation container viewed from the column direction.

In FIGS. 2 and 3, the numeral 1 is the cultivation container made of vinyl in the form of rectangular box. The shape of the cultivation container 1 can be the form of a barrel in which a cross section is a semicircular. The cultivation containers 1 are installed horizontally and doubly with leaving a space by a supporting base 2' in a building 2. Although a double cultivation container is shown in FIG. 2, six to eight cultivation containers are installed horizontally and in parallel with equally leaving a space because necessary number of stages from the floor to the ceiling are allocated with equally leaving a space in supporting base 2' in an actual plant factory for mass-production. The numeral 3 is a circulation pump for providing the cultivation water solution in the cultivation container 1 located in the top position. As shown in FIG. 4, a light reflection member 13 is stuck on the upper side of a cultivation base 10 and a light invasion protection board 15 is provided on the lower side of a cultivation base 10. The light invasion protection board 15 prevents producing algae in the cultivation water solution by light invasion and the plant root causing cultivation injury by light invasion.

Each of two white color fluorescent lights 16 is suspended and supported obliquely to each upper portion of the cultivation containers 1 by chain suspenders. The three wave length type of the fluorescent light 16 is well known as the best light for the growth of the plants as a result of the experiment. As a nursery plant grows, the cultivation base 10 is moved toward the left side in FIG. 4, thus the distance D (FIG. 4) between the top of the plant and the fluorescent light 16 is kept constant even if the plant grows bigger. Thus, irradiation quantity to the plants will be kept constant. If the distance D is 1 to 10 cm, the plants can grow extremely rapidly because the chip-burn will not be caused by the raised leaf temperature by the heat energy by the fluorescent light 16 and the plant will be irradiated constantly. In FIG. 2, it will take almost 3 to 4 weeks for the plants to grow from the nursery plant on the right-hand side to a full-grown plant on the left-hand side and it will take almost 5 days for the plants to be harvested by moving the cultivation base 10 to the left-hand side. The temperature inside the building 2 is kept almost 17° C. by the air conditioner. For this purpose, the air conditioner 19 is installed (FIG. 2). The numeral 20 is a compressor. The numeral 21 is a condenser. The numeral 22 is an air cooling fan. The numeral 23 is a cool air pathway. The numeral 24 is an evaporator. The numeral 25 is a ventilator.

Inside the cultivation container 1, air bubbles including high density carbon dioxide gas are compulsory blown into the cultivation water solution continuously during a plant cultivation time by the pump 26. The numeral 30 (FIG. 4) is a conventional air stone for this purpose.

The circulation of conventional hydroponic liquid, shown in FIGS. 3 and 4, is explained below. The cultivation water solution supplied by the circulation pump 3 (FIG. 3) drops down naturally into the cultivation container 1 thorough a siphon 4 (FIG. 2), returns back into the upper cultivation container by the pump 3, and thus circulates in the cultivation container 1. The water level of cultivation water solution in the cultivation container 1 is kept constant by the siphon 4. The circulation pump 3 is automatically controlled continuously or at intervals of a constant time (for example, 15 minutes). In FIG. 4, when cultivation water solution is sent into the upper cultivation container by the pump 3, the upper water level raises up to the water upper limit level H of the siphon, and finally the pump 3 stops. After that, when cultivation water solution is discharged naturally for the lower cultivation container in which the water level is the lowest and the water level of the upper cultivation container becomes the lowest control level L of the siphon, the discharge stops. The water level is controlled in order for the root to remain still in cultivation water solution even if the water level is the lowest.

As shown in FIG. 3, according to the conventional apparatus, a support part 8 is provided to movably support the cultivation base 10 inside the cultivation container 1. As shown in FIG. 3, each of the cultivation bases 10 is so arranged closely as to freely slide sideways since both ends of the cultivation base 10 are supported by the support parts 8 or by the upper ends of the cultivation container 1 as shown in FIG. 5.

According to the present invention, one example for supplying hydroponic liquid is explained below.

Figure 1:
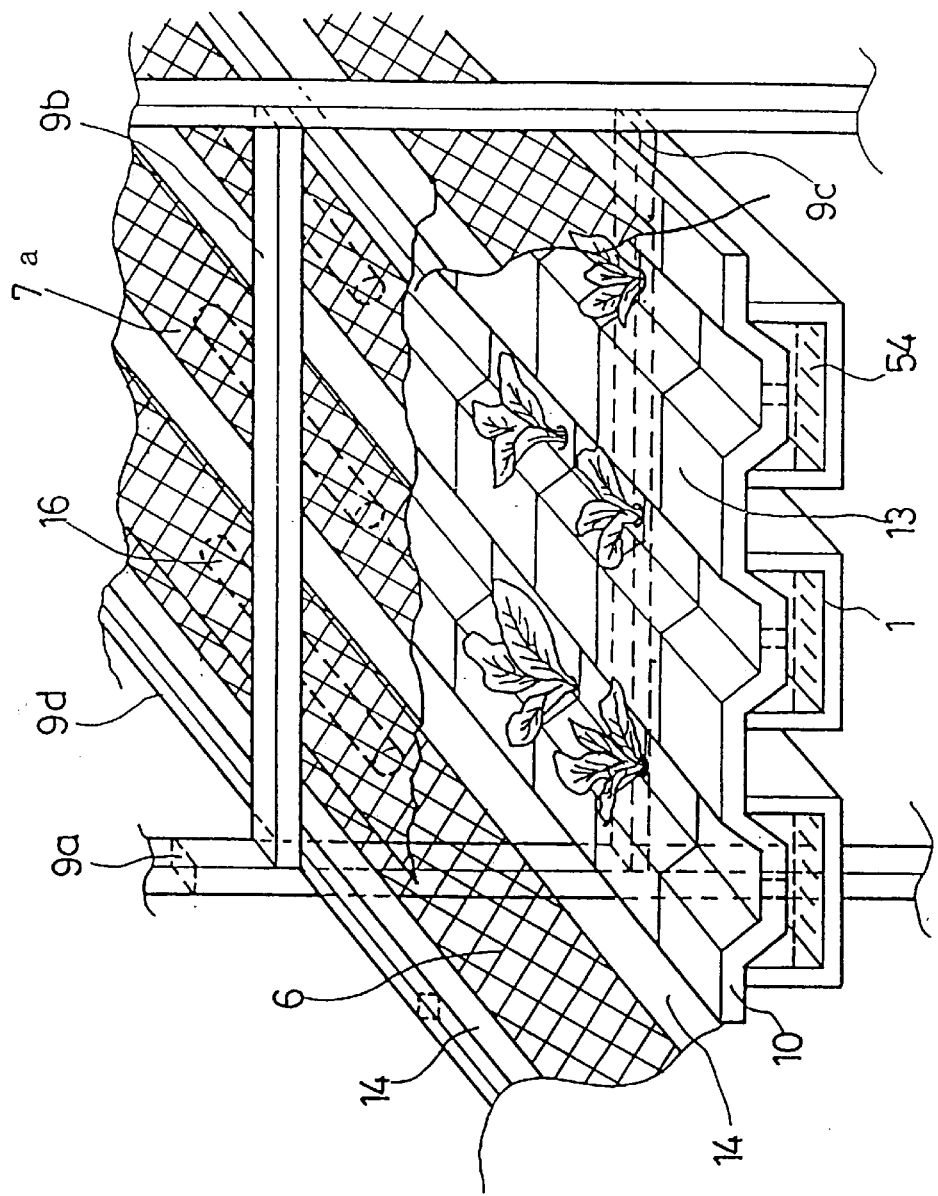
FIG. 1 is a general perspective view of a cultivation container apparatus of the present invention.

FIG. 1 is a general view of a cultivation apparatus of the present invention. FIG. 12 is a general section view. The same things as the conventional apparatus are cultivation water solution circulation, air conditioner, and the basic structure in which the wall insides of the cultivation room are covered by the light reflection material. Here, each of the same part numbers is used respectively for each of the parts corresponding to the conventional apparatus.

Figure 6:
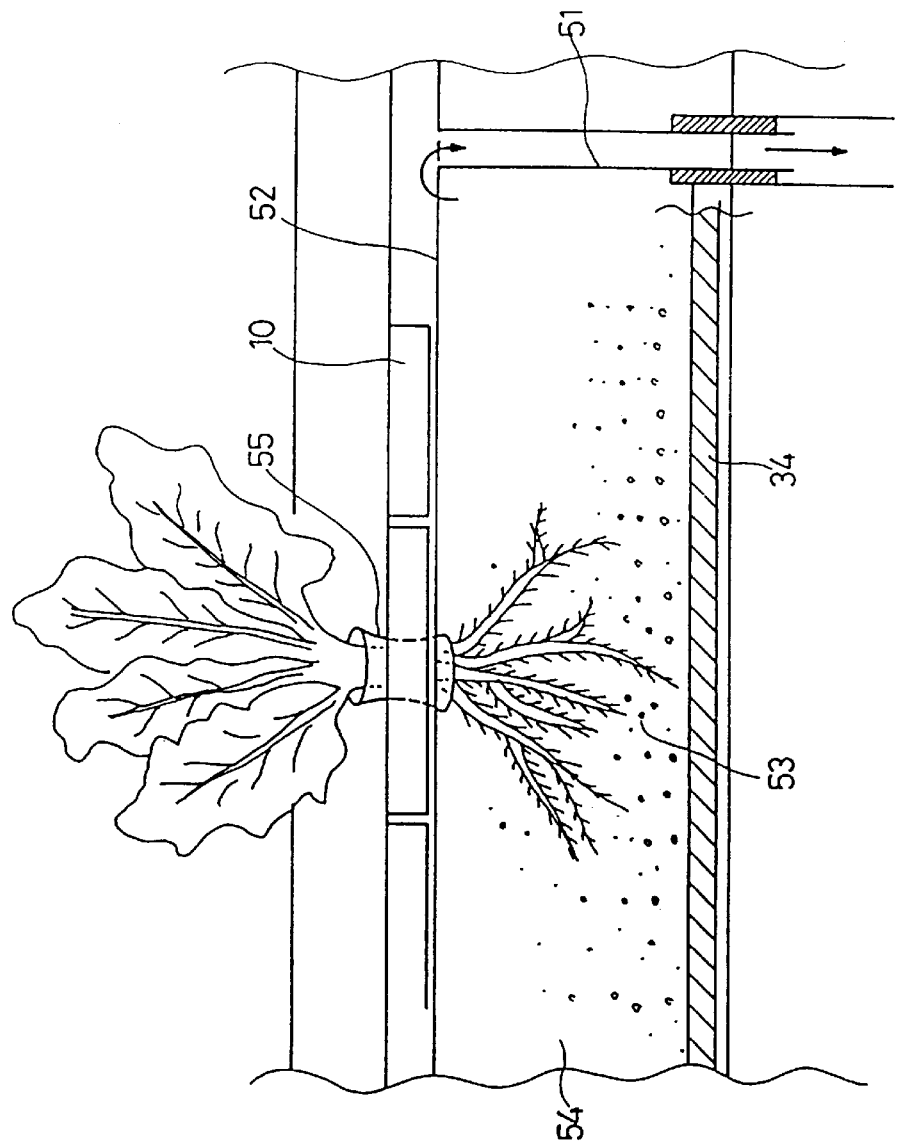
FIG. 6 is a detailed partial section view of a cultivation container apparatus of the present invention.
Figure 7:
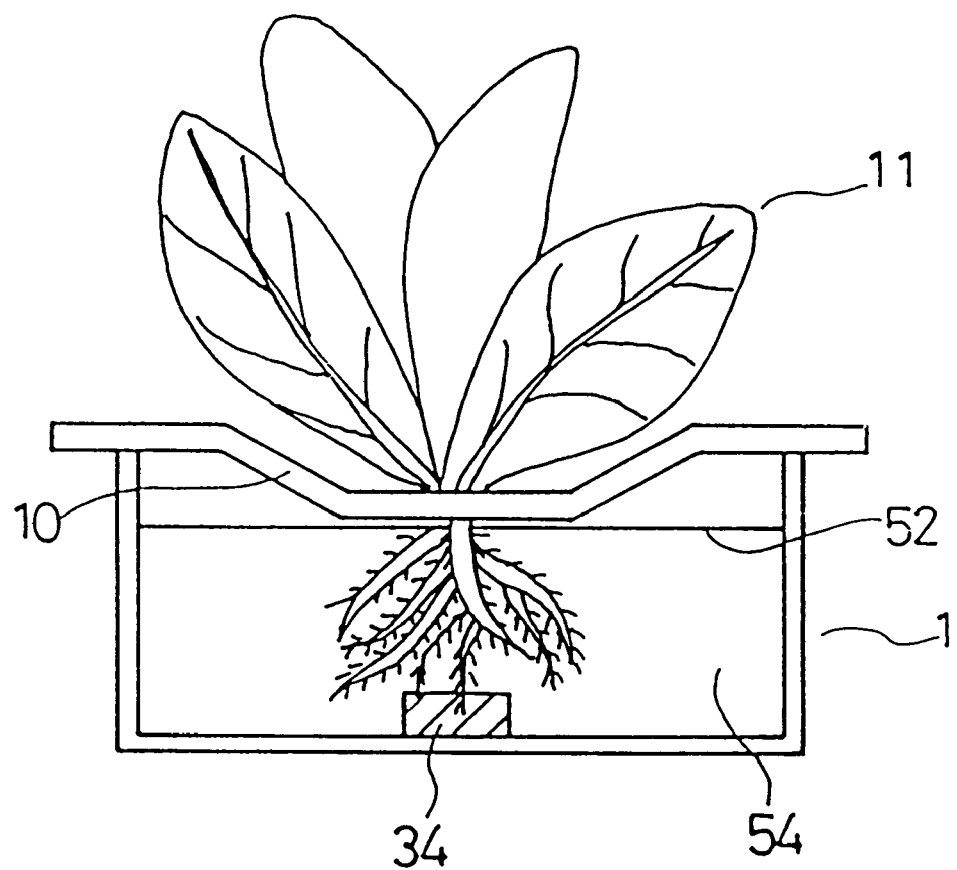
FIG. 7 is a partial detail cross section of the cultivation container apparatus viewed from column direction.

FIG. 6 is a detailed partial section view of a cultivation container compared with FIG. 4 for the present invention. FIG. 7 is a cross section of a cultivation container when FIG. 6 is viewed from vertical (column) direction.

In the same way as the conventional apparatus, overflowed cultivation water solution for each position naturally has dropped down to the lower cultivation container through a pipe 51 for adjusting the water level, as shown in FIG. 6, thus cultivation water solution which is continuously supplied to the highest position by the pump circulates inside the cultivation container though the pathway for returning back to the upper container by the pump. According to the present invention, the depth of cultivation water solution in each cultivation container 1 is so kept lower level as much as possible that the bottom of the cultivation base 10 is dump as shown in FIGS. 5 and 7, thus the water level can be kept constant thorough the pipe 51 for adjusting the water level.

The cultivation base 10 is made of resin or metal material providing the light reflection member 13 (FIG. 4) made of aluminum or stainless steel on the surface as seen in the conventional apparatus and provides holes 12 for inserting the nursery plants. For example, in the case of a lettuce, three holes 12 are provided on the cultivation base 10, the upper root is wound with urethane (FIG. 6, the numeral 55) on condition that several leaves has grown up from a seed leaf and inserted into the hole. Thus, the plants usually arranged sideways in three rows are cultivated.

The light reflection member reflects light from the artificial light source, reduces as much as possible the electric power consumption by efficiently using a less quantity of light, and prevents the chip-burn by decreasing the heat energy from the artificial light as much as possible.

According to the present invention, as shown in FIGS. 6 and 7, an air supply tube 34 is provided in cultivation water solution inside the cultivation container, then air including high density carbon dioxide gas jets out from small holes provided in the air supply tube 34 and produces bubbles. The jets of the air supply tube 34 are desirably provided near directly under the plant root in point of oxygen supply to the root, gas supply to the surface of the leaf, and cooling effect to the surface of the leaf.

Carbon dioxide gas produced in a carbon dioxide gas production apparatus can be supplied through the air supply tube 34 by the pump. Otherwise, air in a factory can be directly supplied through the air supply tube 34 by installing a combustion apparatus for producing carbon dioxide gas at a corner in the factory and changing the carbon dioxide gas density of the factory to the specified density described above. As the carbon dioxide production apparatus, the combustion apparatus based on a catalytic oxidation method, in which fuel such as benzine or butane is burned with an oxidation combustion catalyst such as platinum, may be used. The combustion apparatus can burn fuel under the constant condition all the time, so carbon dioxide gas can be produced stably and constantly based on the burning condition. In the case of installing the combustion apparatus for producing carbon dioxide gas at a corner in the factory, when a quantity of carbon dioxide gas necessary for growing the plants is nearly equal to a quantity of carbon dioxide gas produced by the combustion apparatus, although it depends on the factory area size, it is found that the carbon dioxide gas density of the circumstance is nearly constant.

Carbon dioxide gas is indispensable for the photosynthesis of the plants. The carbon dioxide gas density can be kept almost more than 500 ppm (preferably, 1,500 to 2,000 ppm) by using high density carbon dioxide gas as described above. The carbon dioxide gas density included in air blown into cultivation water solution in the cultivation container 1 is preferably 1,000 to 2,000 ppm, because the effect for hastening the growth of the plants and preventing cultivation water solution decay cannot be expected if lower than 500 ppm and a mineral fertilizer ingredient contained in cultivation water solution may be educed if higher than 5,000 ppm since the carbon dioxide gas density is too high and pH may be easily low. A nozzle or the like can be used for continuously blowing air containing high density carbon dioxide gas into carbon dioxide liquid without using a porous tube.

According to the present invention, since carbon dioxide gas is supplied from the position right under the plant root, the carbon dioxide gas absorption rate is more superior than the conventional method for separately filling carbon dioxide gas inside the cultivation room. At the same time, oxygen can be supplied sufficiently to the root by air bubbles containing oxygen because air containing high density carbon dioxide gas is forcibly blown into cultivation water solution continuously and the bubbles are produced during a time for the growth of the plants. Moreover, there is an effective result in which bacteria in cultivation water solution or microscopic organic matters can be prevented from their decay while carbon dioxide gas weakly oxidizes cultivation water solution and mixes the bubbles.

Further, the surfaces of the leaves can be cooled in effect and the leaves' heat injury (chip-burn) caused by rising temperature by the artificial light source can be prevented in effect because the air bubbles rise up from the back of the leaves.

In FIG. 1, the cultivation base 10 is united and mounted on a plurality of the cultivation containers 1 arranged sideways in 3 lines and aluminum foil is so stuck to the surface of expanded polystyrene as to be a light reflex member. The shape of the cross section of the cultivation base 10 is waved as seen in FIG. 1, and the shape of the cultivation base portion located in the middle portion of the cultivation container 1 is hollowed toward the inside of the cultivation container 1.

Figure 11:
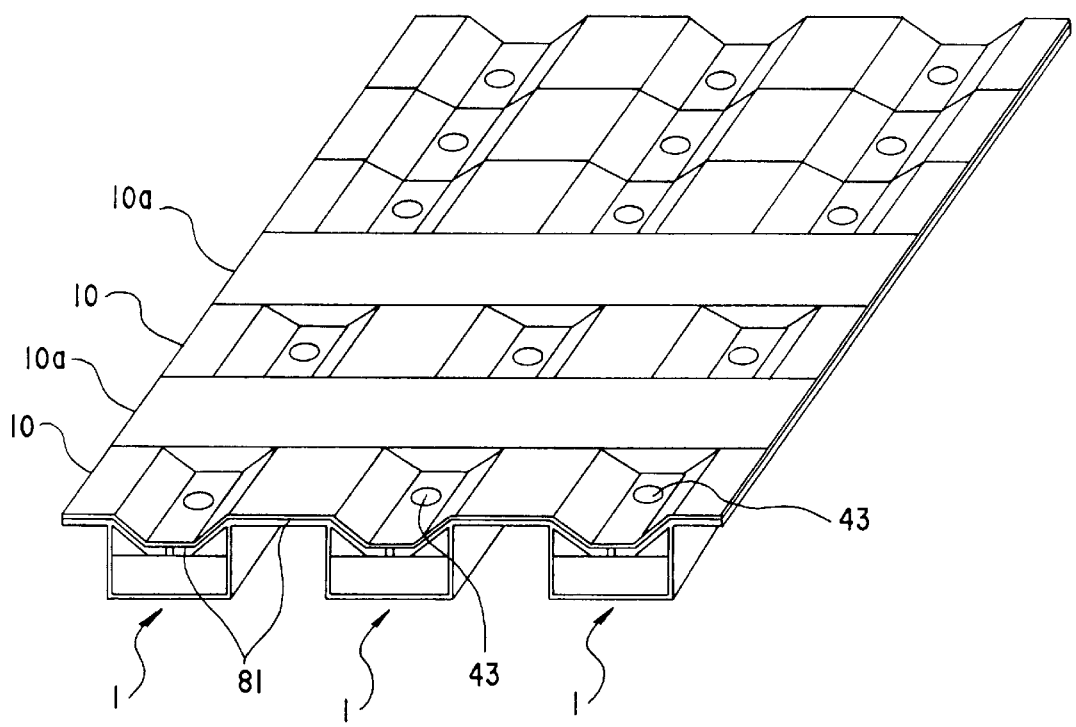
FIG. 11 is a general perspective view of the cultivation base for the cultivation container apparatus of the present invention.

FIG. 11 shows the detail structure of the cultivation base. The bottom face of the hollow portion is close to cultivation water solution 1, and the cultivation base is designed so that the upper portion of the root can be completely bathed in cultivation water solution. The air supply tube 34 with open holes is provided under the plant in cultivation water solution as shown in FIG. 6 and 7, and air bubbles containing carbon dioxide gas all the time are released from many holes. Thus, oxygen can be supplied sufficiently to the root even if the base root of the plant root is not completely bathed in cultivation water solution.

In FIGS. 1 and 12, the cultivation room is shown by the space 17 (FIG. 12) enclosed by iron flames 9a to 9d constructed in a longitudinal direction. The space 17 is enclosed by the light reflection member to which aluminum foil is attached in all the directions. In the FIGS. 1 and 12, light reflection side wall members 6 are attached to the flames 9a and 9d. A ceiling light reflection member 7 of the cultivation room is attached to the upper flame 9b. A gap 14 is purposely provided in a lower side of the side wall light reflection member 6. This gap 14 is designed to release the heat energy to the exterior based on a convection current. In FIG. 1, although the ceiling portion of the cultivation room only for an installing member 7a for installing the fluorescent light is drawn, aluminum foil is attached to the installing member 7a for the practical purpose as shown in FIG. 12. Namely, the ceiling portion of the cultivation room is completely covered by the light reflection member. The slight gaps 98 and 99 are provided in the right and left sides of the cultivation room as shown in FIG. 12. The surface of the cultivation base is covered by aluminum foil, accordingly nearly all the surfaces without the gaps become the light reflection surfaces in all sides.

In FIG. 12, the upper light reflection member 7 is provided on the ceiling of the cultivation room, side wall light reflection members 6 are provided on the wall sides of the cultivation room, the fluorescent light 16 is installed on the top, and the surface and back sides of the plant can be well irradiated effectively by these light reflection members. Each structure provided in the cultivation room is the same as the above described structure.

Further, as described above, all the area for the upper surface and side surfaces are not covered thoroughly by light reflection members. For example, pathways 98 and 99 for air ventilation are provided for both sides of the light reflection member 7, and pathways 14 are provided for the upper and lower sides of the side light reflection members.

Figure 14:
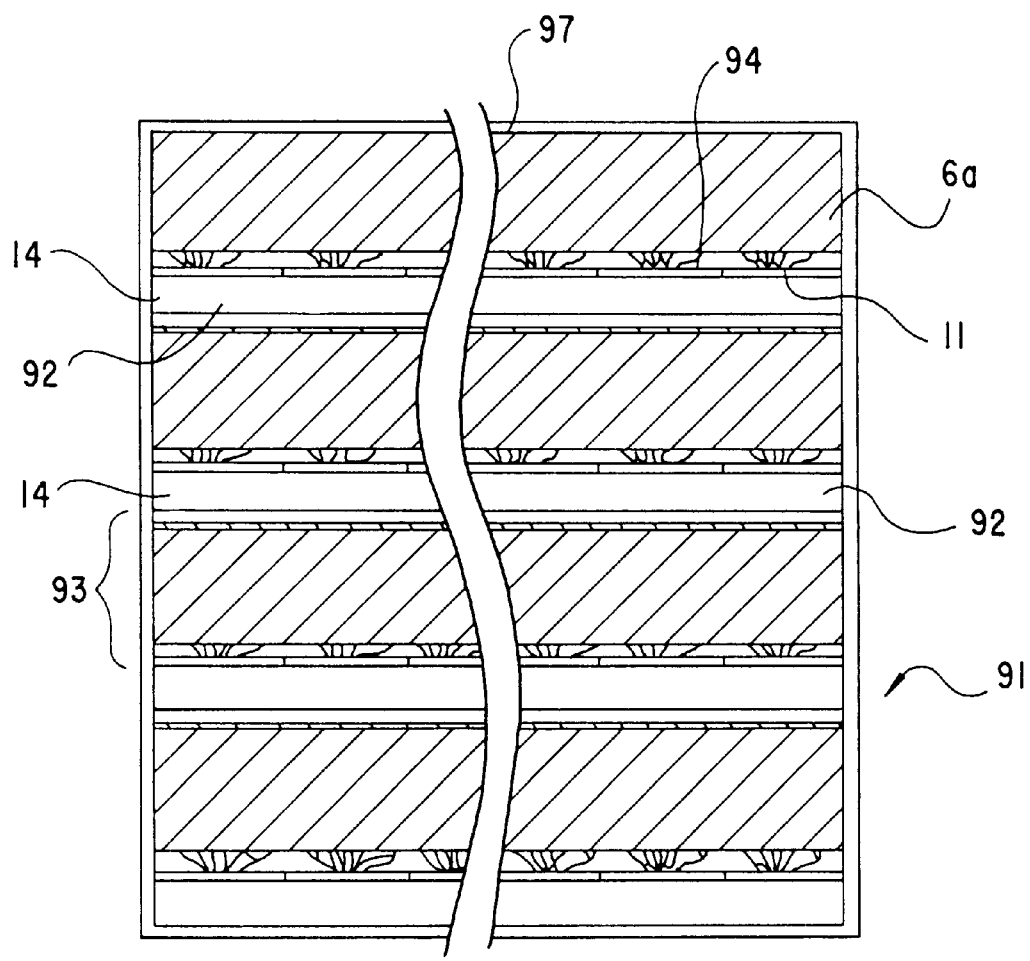
FIG. 14 is a side view of the plant cultivation container apparatus of the present invention.

FIG. 14 is a side view of the plant cultivation container of FIG. 12. The pathways for air ventilation are provided in the upper and lower sides of the side light reflection plate 6a, and a gaseous body can circulate well between the inside and the outside. Space is provided between the cultivation base 10 and a frame 9, and the pathways 99 for air ventilation from the top to the bottom are provided (FIG. 12).

As mentioned above, according to the present invention, the plants can be irradiated without futileness since the fluorescent light makes multi-reflection inside the cultivation room. Thus, vegetables without agricultural chemicals can be cultivated cheaply as well as energy saving for cultivation, because the plants can be well cultivated by a weak light source such as the fluorescent light source and the chip-burn rarely occurs since the artificial light source producing high heat energy is rarely used for cultivation.

Further, it is the strong point of the present invention that the plants can be cultivated sufficiently even if a quantity of light is 30 to 70% of the regular output quantity of fluorescent light by applying the newly developed cultivation technology. The fluorescent light becomes so hot temperature, approximately 100 to 200° C., on the surface as for us not to touch when working according to the regular rated specification, although the fluorescent light does not generate higher heat energy than other light sources. Therefore, when the plant contacts with the surface of the fluorescent light, a burned hole is made because of radiant heat energy as usual and contact heat energy described above.

When the fluorescent light is used so that the output energy of the fluorescent light is 30 to 70% of the regular output energy of fluorescent light, the surface temperature of the fluorescent light can be nearly equal to the room condition temperature (5 to 10° C. higher than the room temperature at most). This means, as mentioned before, that the present invention has been a great success for raising the efficiency of a quantity of light for irradiating the plants for growing the plants.

Specifically;

①  It was a great success that the light irradiation effect for growing the plants were raised by making artificial light multi-reflection by covering all the walls of the cultivation rooms with the light reflection members.

②  It was a great success that air bubbles containing high density carbon dioxide gas from the portion just under the plant root in the cultivation container were jetted, the $CO_2$ absorption effect from the plant leaves was raised based on the compulsory circulation effect by air bubbles, and the heat energy release from the surface of the plant leaf was hastened.

③  It was a great success that the cooling effect from the surface of the leaf was hastened by supplying oxygen sufficiently to the plant root by jetting the air bubbles mentioned above, hastening the growth of the root by bathing the plant root until the basic root, and activating evaporation from the leaf and water absorption from the healthy root.

④  It was a great success that radiation based on heat circulation within the cultivation room was hastened by providing the gaps in upper and lower sides of the side walls of the cultivation container.

⑤  It was a great success that a quantity of light could be decreased based on the circulating effective result in which a quantity of light was decreased by a newly-devised idea of the present invention at first, secondly the heat energy from the fluorescent light was less generated than the conventional method, thirdly the light source much closer to the plants could be set, fourthly a quantity of light could be decreased as the same effective result as the first, and thus these steps circulated.

Accordingly, the synergetic effect, in which the fluorescent light could grow the plants completely and healthy even if the output energy was controlled to 30 to 70% of the regular rated output energy, caused by multiple factors was made possible. The output of the fluorescent light has been controlled by an inverter.

Figure 13:
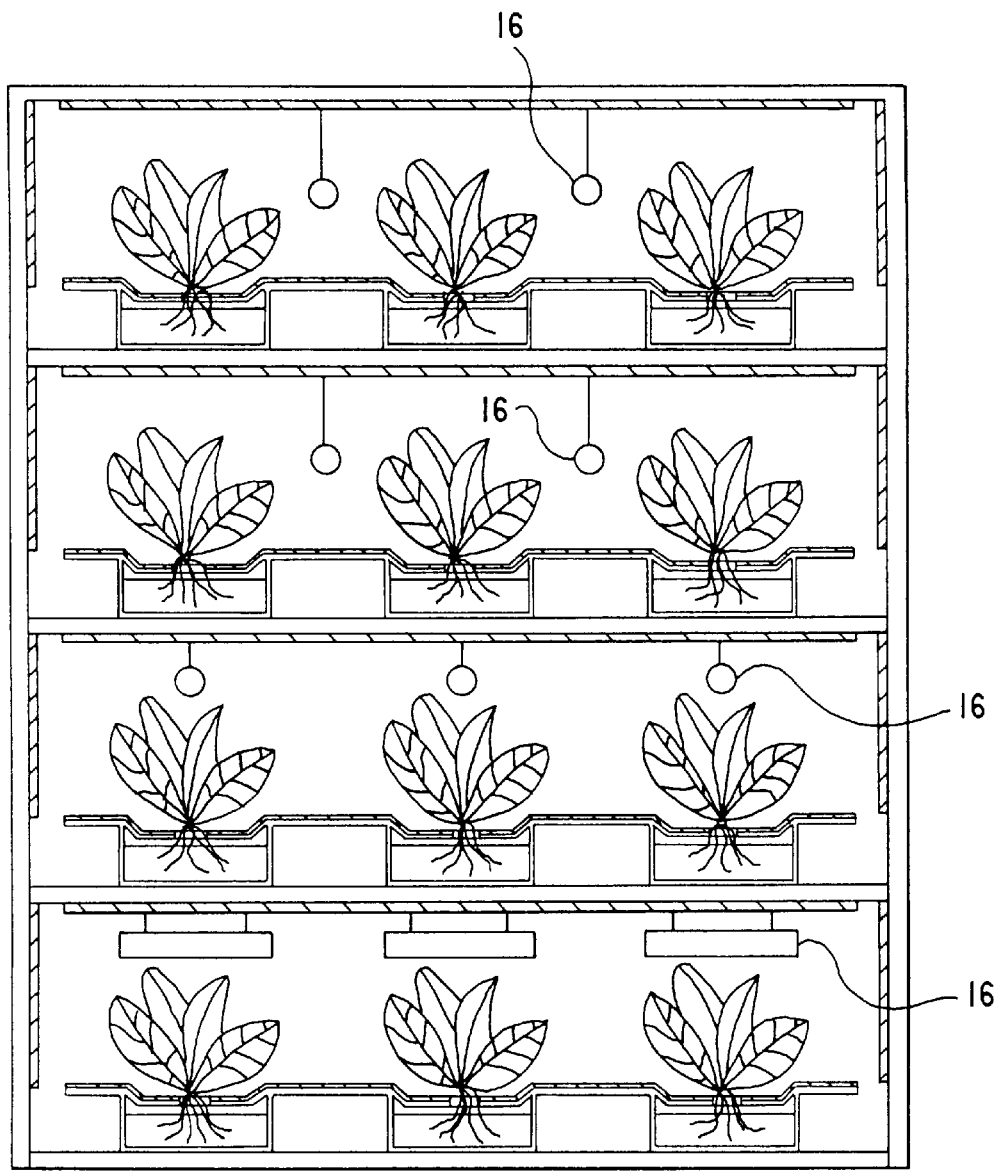
FIG. 13 is a general section view of another embodiment of the cultivation container apparatus of the present invention.

Other applications for the cultivation apparatus and the cultivation method of the present invention are explained below based on the fact that the chip-burn has not been caused even if the leaf has contacted directly with the surface of the fluorescent light. FIG. 13 shows another example of the present invention.

According to the conventional apparatus, the fluorescent light has been set to the ceiling of the cultivation room as shown in FIG. 12. This is because the plant root should not touch to the fluorescent light even if the plant has grown up.

However, according to the cultivation apparatus and the cultivation method of the present invention, it is possible that the fluorescent light can be set by hanging from the ceiling and setting closer sideways to the plants as shown in the first and second containers of FIG. 13. Otherwise, the fluorescent light can be set much closer to the plants by hanging from the ceiling even if it is over the plants as shown in the third room of FIG. 13. It is not necessary for the setting direction of the fluorescent light to be parallel to the longitudinal direction of the cultivation container as seen in the conventional apparatus, but it is allowable to be perpendicular to the longitudinal direction as shown in the forth container of FIG. 13. This is based on the fact that the chip-burn does not occur even if the plant leaf touches the fluorescent light because the temperature of the fluorescent light is lower.

Here, although the above preferred embodiments are related to the hydroponic cultivation, the present invention should not be limited to the hydroponic cultivation. The apparatus and the method of the present invention can be applied to every kinds of the cultivation methods such as soil cultivation, rubble cultivation, and sand cultivation.

Next, the plant cultivation board of the plant cultivation apparatus of the present invention is explained.

Figure 8:
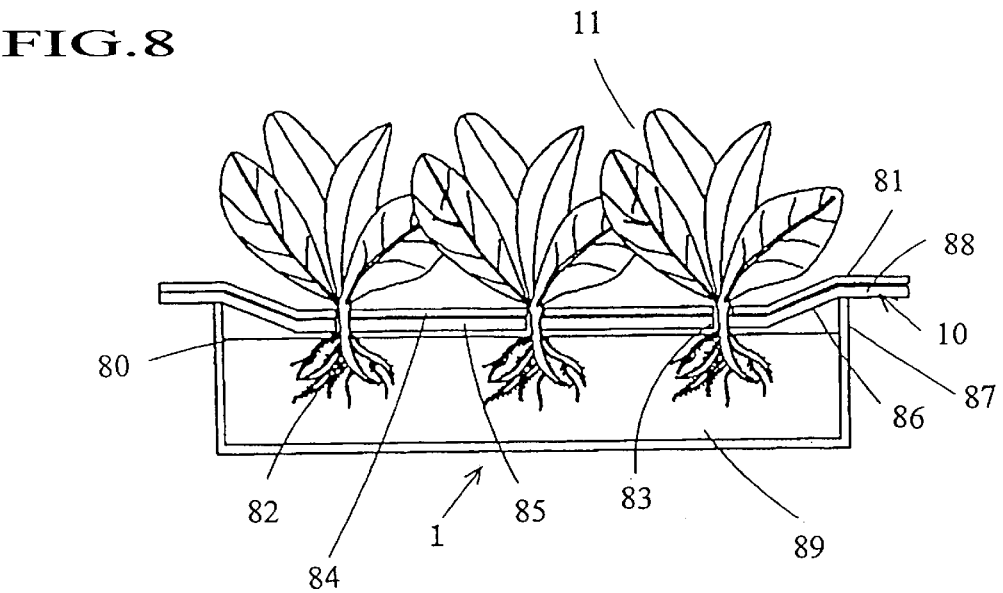
FIG. 8 illustrates one example of the cultivation base of the plant cultivation container apparatuses of the present invention.

FIG. 8 shows one example of the plant cultivation apparatuses of the present invention and is a cross sectional view of the present invention.

The cultivation base 10 having holes 83 for receiving nursery plants is provided in the upper open portion of the cultivation container 1. The cultivation base 10 includes a nursery plant installation member 85. The nursery plant installation member 85 is connected to slant members 86. Each of the slant members 86 is connected to each of flat members 88 supported by the wall members 87 of the cultivation container 1. As a result, the nursery plant installation member 85 of the cultivation base 10 is located near water level 80 of cultivation water solution 89 in the upper open portion of the cultivation container. Here, the slant face of the cultivation base can be formed to a flat plate or a conic support.

A light reflection member 81 such as aluminum or stainless is provided on the surface of the cultivation base 10 in order for the light irradiated from the upper portion to irradiate the back of the leaf. The light reflection member can be metal or material in which metal and synthetic resins are layered.

According to the apparatus shown in FIG. 8, since the water level 80 of cultivation water solution 89 in the cultivation container 1 is formed near the nursery plant installation member 85, the root 82 is immediately bathed in cultivation water solution within the cultivation container, then a hair root grows well, accordingly the plant will grow healthily.

Although a drop of water condensed from the steam evaporated from cultivation water solution adheres to the slant members 86 provided in the cultivation base 10, it will not decrease cultivation water solution or dirty the outside by dropping because it has dropped within cultivation water solution through the slant members 86 but not dropped outside the container. Further, the slant member 86 functions as a guide when the cultivation base 10 is installed in the cultivation container 1, thus the slant member 86 makes installation to the cultivation container 1 easy and makes it possible in a short time to install many cultivation bases 10, because the movement of the cultivation base 10 is controlled by the wall members 87 of the cultivation container 1 by fabricating the cultivation base 10 in which the distance between joints of the slant members 86 and the flat members 88 is fit to the width of the cultivation container 1.

The size of the cultivation base 10 may be changed according to the plant growth condition, and plural nursery plants can be installed in the nursery plant installation members 85 according to the size of the nursery plants. Further, the space between the cultivation bases 10 in which the plants are installed can be maintained by installing, between the adjacent cultivation bases 10, as shown in FIG. 11, at least one cultivation base 10 in which the plants are not installed in order to widen the space between the plants according to the plant growth. Further, the space size can be maintained by desirably changing according to the plant growth by using the different space size of the cultivation base 10.

Figure 9:
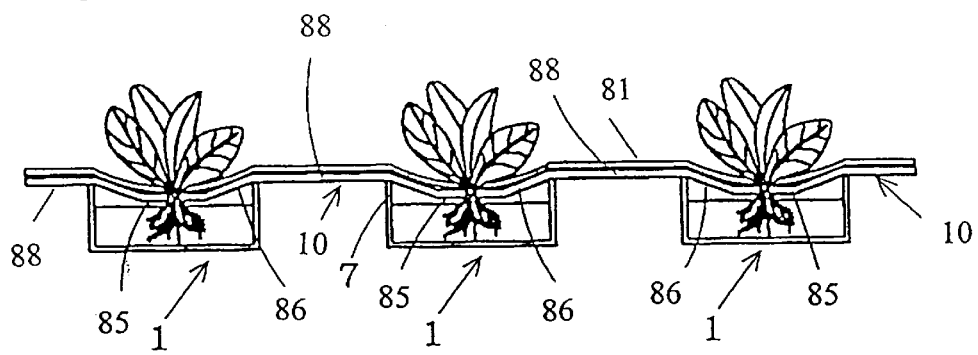
FIG. 9 illustrates another example of the cultivation base structure for the cultivation container apparatus of the present invention.

FIG. 9 is an explanatory view for installing the cultivation bases on plural cultivation containers arranged in parallel.

The cultivation base 10 is formed by jointing each of the nursery plant installation members 85 with each of the slant members 86 and covering plural cultivation containers 1.

The cultivation base 10 can be installed very easily because plural cultivation containers 1 are arranged in parallel, the slant members 86 function as a guide by gearing each of the cultivation containers 1 with each of the slant members 86.

The space of the cultivation container can be reduced because the size of the cultivation container necessary for growing the plant can be reduced by fabricating the cultivation container for the width to be fitted only for one plant, compared with the space for using a wide width of the cultivation container. As a result, since the members necessary for maintaining the cultivation container do not require strong strength, cultivation containers especially for a multistage way can be installed suitably. FIG. 1 is a general view for showing the above described structure.

Figure 10:
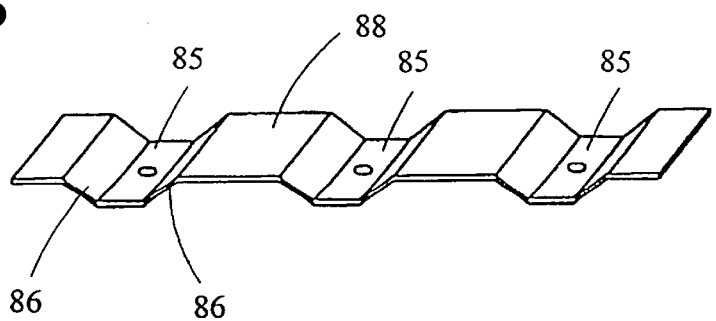
FIG. 10 is a perspective view for showing the cultivation base for the cultivation container apparatus of the present invention.

FIG. 10 is a perspective view for showing the cultivation base. Three nursery plant installation members 85 are connected with the slant member 86 jointing with the flat member 88 as shown in FIG. 10. The cultivation base 10 can be formed as a united one by molding resin or the like. Although the cultivation base 10 can be any kind of resin material, forming plastic such as expanded polystyrene weighs light and is excellent for insulation and controlling a drop of water produced by evaporation from cultivation water solution on the surface of the cultivation base 10.

FIG. 11 is a perspective view for explaining an example for which multiple cultivation boards are installed on three cultivation containers arranged in parallel.

The cultivation bases 10 providing the light reflection members on their surfaces are arranged on the cultivation containers 1, and a number of width adjusting cultivation bases 10a can be installed in case of need between the cultivation bases 10 in order for the plants not to touch with each other according to the plants' growth. The width adjusting cultivation base 10a does not provide a hole for accepting a nursery plant, but it is desirable that the light reflection member be provided on the surface of the width adjusting cultivation base 10a as seen in the cultivation base 10.

Figure 12A:
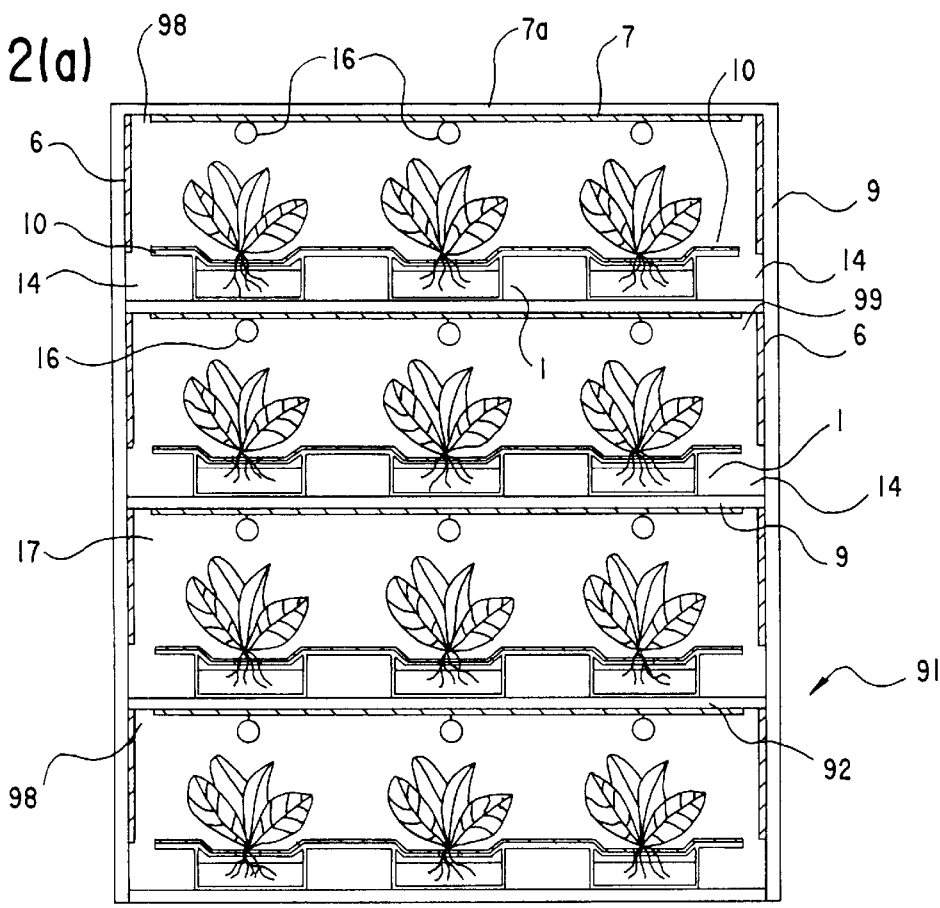
FIG. 12 is a top plan view and a general section view of the cultivation container of the present invention.
Figure 12B:
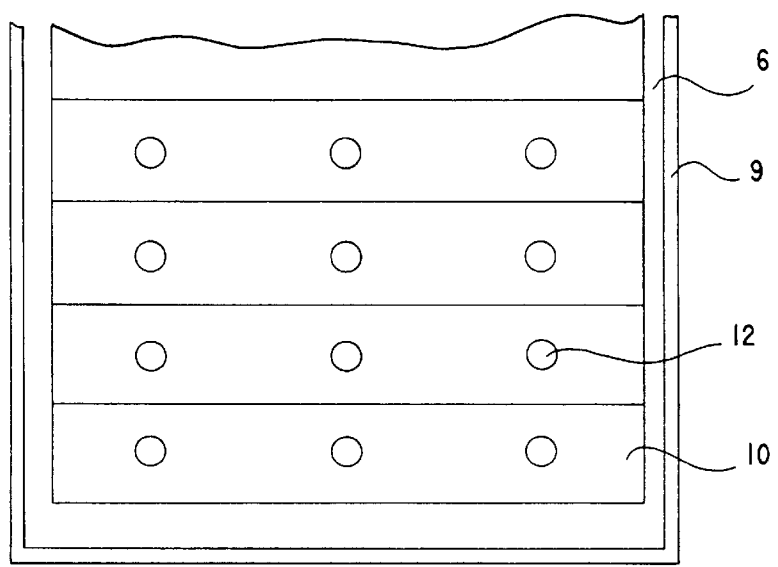

FIG. 12(a) is an explanatory view for an example for which multiple cultivation containers are provided and the section of a shelf body. FIG. 12(b) is a top plan view for each shelf of the cultivation container.

A plurality of cultivation containers 1 are provided on an installation member 92 of the shelf body 91. The installation member 92 can be a shelf plate member or a member for holding the cultivation containers arranged with a predetermined interval. The cultivation base 10 in which a plurality of nursery plant installation members are connected is installed on the cultivation containers 1 and the light reflection member is installed on the surface of the cultivation bases 10.

Using the apparatus mentioned above, the cultivation experiment was carried out. The fluorescent light rating 40 W was used as the artificial light source outputting 40 to 60% of the rated specification by arranging over the plant line in the longitudinal direction of the cultivation room.

The nursery plant having three to four true leaves was used, each of two nursery plants was inserted into each hole 2 and supported by the cultivation base in a 30 cm distance. The plants were cultivated for three weeks with keeping the predetermined distance mentioned above by setting the distance between the upper end of the plant 11 and the fluorescent light 16 in a 1 to 10 cm distance and then moving sideways the plant cultivation board once a day. Here, the circulating pump 3 was operated intermittently for five minutes working and ten minutes breaking, and the water level of each shelf was kept nearly constant for completely bathing the basic root. Usual fertilizer found in the market for hydroponic cultivation was used. The temperature within the building 2 was 17° C., the carbon dioxide density was more than 1,000 ppm, and the density of illumination was more than 5,000 luxes. As a result, a stump of lettuce weighing 150 to 200 g was harvested once a day, and the quality was excellent.

As mentioned before, the chip-burn could not be caused because the surface temperature of the fluorescent light was nearly equal to the room temperature even if the upper side of the leaf has contacted directly with the fluorescent light when the plants grew up.

Still more, vegetables for cultivation should not be limited to the lettuce, but other vegetables or plants such as root vegetables, decorative plants, tomatoes, herbs, beanplants, barleyplants, rice plants, and so forth are available for the cultivation.

INDUSTRIAL APPLICABILITY

When the cultivation for the lettuce was made using the apparatus mentioned above, the root and leaves could better grow actively than the conventional hydroponic cultivation. Moreover, heat injury such as the chip-burn could not been caused, and tasty vegetables such as lettuces without agricultural chemicals could be harvested. Further, utilizing multiple light reflection by covering the all insides of the cultivation container with the light reflection members, the plants can be cultivated with an extreme low quantity of light as not made in the conventional embodiment under such a circumstance that the fluorescent lights for 40 W as rated specification are arranged in parallel and used for 30 to 70% output of the rated specification. According to the apparatus described above, since the surface temperature of the fluorescent light is nearly equal to the room temperature, heat injury (chip-burn) cannot be caused by the artificial light source (fluorescent light) and the vegetables in which the leaves are much softer than open-field culture are cultivated even if the distance between the upper end of the plant and the fluorescent light becomes short until 1 to 10 cm or the top of the plant touches with the fluorescent light in final harvest season.

Moreover, since multiple light reflection can be made within the cultivation room and the plants can be irradiated within a short distance, a quantity of light from the artificial light source can be utilized maximum, and thus electric power consumption can be reduced to less than a third consumption of the conventional embodiment. Such vegetables without the agricultural chemicals as softer and tastier vegetables than vegetables in open-field culture have been able to be cultivated because the price competitive power has been stronger than the conventional vegetables in open-field culture based on the less cost consumption mentioned above. Further, since they can be harvested throughout the year without accepting the influence of the season or circumstances as seen in the conventional vegetables in open-field culture, the present invention is an excellent plant factory because fresh vegetables can be harvested every day even in a desert in the summer or such cold circumstances as Northern Europe in winter without sunshine.

What is claimed is:

1. A method for growing a plant comprising the steps of:
   irradiating a cultivation plant with an artificial light;
   bathing a plant root in cultivation water solution containing fertilizer; and
   forcibly blowing carbon dioxide gas the density of which is more than 500 ppm, right under the cultivation plant, and producing intermittently air bubbles under said cultivation plant,
   wherein a whole plant root including a base is constantly completely bathed in said cultivation water solution.

2. The method of claim 1, wherein the carbon dioxide gas has a density of 1,000 to 5,000 ppm.

3. The method of claim 1, wherein;
   said plant is a green vegetable such as a lettuce in particular, and said plant is cultivated using a minimum quantity of light using a fluorescent light as said artificial light source by covering all insides within said cultivation container with a light reflection layer.

4. An apparatus for growing a plant using an artificial light by bathing a plant root in cultivation water solution containing fertilizer, forcibly blowing carbon dioxide gas the density of which is more than 500 ppm, right under a cultivation plant, and producing intermittently air bubbles under said cultivation plant during a plant cultivation period, wherein; said plant root including a base is completely and sufficiently bathed in said cultivation water solution constantly using a cultivation base in which a nursery plant installation portion having a nursery plant installation hole is provided near a liquid surface in an upper open portion of a cultivation container filled with said cultivation water solution, said nursery plant installation portion is jointed with a slant member, and said slant member is jointed with a flat member supported by a wall portion of said cultivation container.

5. The apparatus of claim 4, wherein;
   said cultivation base is formed with said flat member jointing with each slant member projecting from each nursery plant installation portion near each liquid surface of a plurality of cultivation containers installed in parallel with each other.

6. The apparatus of claim 4, wherein;
   said plant is a green vegetable such as a lettuce in particular, and said plant is cultivated using a minimum quantity of light using a fluorescent light as said artificial light source by covering all the insides within said cultivation container with a light reflection layer.

7. A method for growing a plant comprising the steps of:
   constantly irradiating a cultivation plant with a fluorescent light;
   bathing a plant root in cultivation water solution containing fertilizer;
   covering all insides of a cultivation room in all directions;
   maintaining a carbon dioxide gas density in said cultivation room at 500 to 5,000 ppm; and
   controlling the surface temperature of said fluorescent light to room temperature by controlling an output of said fluorescent light to be 30 to 70% output of rated specification.

8. The method of claim 7, wherein;
   said output of said fluorescent light is controlled by an inverter.

9. The method of claim 7, wherein;
   said plant is a green vegetable such as a lettuce in particular.

10. An apparatus for growing a plant using a fluorescent light as an artificial light by bathing a plant root in cultivation water solution containing fertilizer and covering all insides of a cultivation room in all directions in which a carbon dioxide gas density has been maintained 500 to 5,000 ppm, comprising:
    a cultivation room for including at least one or more containers and being layered at least two or more shelves;
    a cultivation board for installing a nursery plant on each cultivation container;
    a light reflection member for reflecting light on said cultivation board, a ceiling surface, and side walls of each cultivation room; and
    an air pathway, in right and left sides of an upper side of each cultivation room and up and down sides of light reflection members of wall sides, for connecting to an outside or an adjacent cultivation room.

11. The apparatus of claim 10, wherein;
    said plant is a green vegetable such as a lettuce in particular.

* * * * *